United States Patent
Saitou et al.

(10) Patent No.: US 6,789,078 B2
(45) Date of Patent: Sep. 7, 2004

(54) MEMBER INFORMATION REGISTRATION METHOD AND SYSTEM, AND MEMBER VERIFICATION METHOD AND SYSTEM

(75) Inventors: Akira Saitou, Saitama (JP); Toshihisa Furuhata, Cremorne (AU); Shigeru Gounohara, Tokyo (JP)

(73) Assignee: Sony Computer Entertainment, Inc., Tokyo (JP)

( * ) Notice: Subject to any disclaimer, the term of this patent is extended or adjusted under 35 U.S.C. 154(b) by 0 days.

(21) Appl. No.: 09/882,369

(22) Filed: Jun. 15, 2001

(65) Prior Publication Data

US 2002/0087543 A1 Jul. 4, 2002

(30) Foreign Application Priority Data

Jun. 16, 2000 (JP) .......................................... 2000-181651
Jun. 12, 2001 (JP) .......................................... 2001-177151

(51) Int. Cl.[7] ............................................... G06F 17/30
(52) U.S. Cl. ........................................ 707/10; 709/227
(58) Field of Search ........................... 707/9, 10, 104.1, 707/200; 455/411; 709/227

(56) References Cited

U.S. PATENT DOCUMENTS 6,112,078 A * 8/2000 Sormunen et al. .......... 455/411
6,385,651 B2 * 5/2002 Dancs et al. ................ 709/227
6,401,085 B1 * 6/2002 Gershman et al. ............ 707/4
6,424,828 B1 * 7/2002 Collins et al. .............. 455/412

FOREIGN PATENT DOCUMENTS

| JP | 04-147361 | 5/1992 |
| JP | 09-231264 | 9/1997 |
| JP | 11-053313 | 2/1999 |
| JP | 11-120398 | 4/1999 |
| JP | 2000-148613 | 5/2000 |

* cited by examiner

Primary Examiner—Diane D. Mizrahi
(74) Attorney, Agent, or Firm—Katten Muchin Zavis Rosenman

(57) ABSTRACT

Users desiring to register as users access web server for personal computers using terminal device, and run a member registration process by registering a member ID and password. When a user that has registered as a member wants to use the membership system service-providing site with a mobile telephone, the user accesses web server for mobile telephones. When an already-registered member ID and password are inputted to web server for mobile telephones, web server for mobile telephones extracts identification information specific to the mobile telephone and records it linked to the already-registered member ID and password. This process enables member information to be centrally managed on a membership system service-providing site that can be accessed from a terminal device and a mobile-telephone.

18 Claims, 4 Drawing Sheets

MEMBER DATABASE

MEMBER INFORMATION REGISTRATION METHOD AND SYSTEM, AND MEMBER VERIFICATION METHOD AND SYSTEM

TECHNICAL FIELD

The present invention relates to technology for managing registered member information in a membership service site on the Internet, and relates more particularly to technology for centrally managing member information in a site that can be accessed from plural mediums.

BACKGROUND ART

Websites on the Internet, such as on-line stores, often require users to register as members so that users can be identified. Member registration is generally accomplished by registering a member ID and password enabling individual identification, an e-mail address, user name, and address for contacting the user, and credit card information for settling payment with a server, on the website.

Now, while a personal computer has conventionally been used to access the web server, recent widespread use of mobile telephones has resulted in an increase in users that use websites on the Internet from their mobile telephone.

Compared with personal computers, however, mobile telephones are limited in the size of the screen for displaying information, and in their operability for inputting text. As a result, a number of websites now provide both a web page having a display format suitable for personal computer displays and an input format presuming use of a keyboard and mouse, for example, and a web page having a display format suitable for the LCD (liquid crystal display) screen of a mobile telephone and an input format presuming use of operating keys.

DISCLOSURE OF THE INVENTION

There are, however, differences between the language system that can be interpreted by the browser function of a personal computer and the language system that can be interpreted by the browser function of a mobile telephone, and the server system for access by personal computers and the server system for access by mobile telephones are normally managed separately. This means that member management is carried out separately, and the same person is managed using separate member IDs on the web page provided by a server system for personal computers and the web page provided by a server system for mobile telephone access.

As a result, the user must go through the registration process on both web pages, and must manage plural member IDs. In addition, when the website is an on-line store, for example, the same person purchasing goods at a same store is treated as a different member when making a purchase after accessing the site with the personal computer and when making a purchase by accessing the site with a mobile telephone, creating such problems as making purchase history management more complicated.

Mobile telephones are also equipped with the smallest number of keys necessary for input, and inputting text is more difficult when compared with a personal computer. The standard input method used by web pages designed for access from a mobile telephone is therefore basically to display a menu and detect the selection made using the operating keys.

However, text input of the member ID, password, address, name, and other information is still required for member registration, and text input of the member ID and password is required for member verification each time the user accesses the site, even though the website presumes access from a mobile telephone. Member registration and verification procedures are therefore complicated and tedious.

An object of the present invention is therefore to provide technology for centrally managing member information in a membership system website that can receive access from plural types of devices.

A further object of the present invention is to provide technology for reducing the work involved in inputting text to a website.

To resolve the above problems, the present invention provides a member information registration system for registering member information in a member database, the member information registration system having a data registration means for accepting an individual identifier and verification code outputted from a first device, and registering the accepted individual identifier and verification code as member data in the member database; and a data updating means for accepting from a second device an individual identifier, verification code, and identification information specific to the second device, extracting from the member database member data matching both the accepted individual identifier and verification code, adding the identification information specific to the second device to the extracted member data, and updating the member database.

The member information registration system and the first and second devices can be connected by a computer network. In addition, a mobile telephone can be used as the second device.

The present invention also provides a member verification system for verifying members in a registered membership system service on a computer network, the member verification system having a member database storing member data correlating a member-specific identification code with identification information specific to a communication device used by the user, and a verification means for, when a verification code and identification information specific to a communication device are received from the communication device used by a user, determining whether member data matching both the received verification code and identification information specific to the communication device are present in the member database, and verifying as a member when the member data are present in the member database.

BEST MODE FOR CARRYING OUT THE INVENTION

An embodiment of the present invention is described next below with reference to the drawings.

Figure 1:
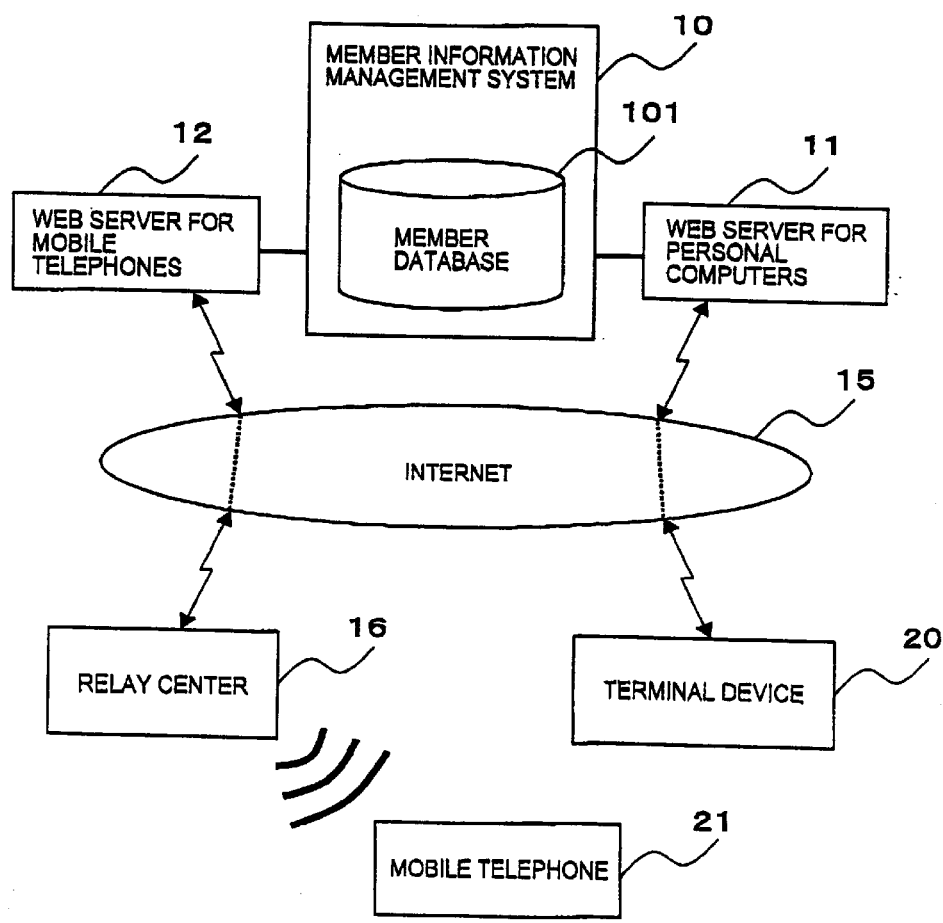
FIG. 1 is a block diagram for schematically describing the configuration of an embodiment of the present invention.

FIG. 1 is a block diagram for schematically describing the configuration of an embodiment of the present invention.

As shown in FIG. 1, member information management system 10 is connected to a web server for personal computers 11 and a web server for mobile telephones 12 by way of a LAN, for example, and web server for personal computers 11 and web server for mobile telephones 12 are connected to the Internet 15 by way of a telephone line, for example.

A terminal device 20 used by a user, and a relay center 16 that converts between the Internet protocol and a protocol that can be used by mobile telephones and thus enables mobile telephones to use the Internet 15, are connected to the Internet 15 by way of telephone lines, for example. A mobile telephone 21 used by a user can thus use the Internet 15 by way of relay center 16.

In this embodiment of the invention web server for personal computers 11 and web server for mobile telephones 12 serve respectively a site that provides an on-line store established by the same entity (store), and users can use terminal device 20 or mobile telephone 21 to use this on-line store. When the on-line store is used with terminal device 20, web server for personal computers 11 is accessed; when used with a mobile telephone 21, the web server for mobile telephones is accessed.

Web server for personal computers 11 and web server for mobile telephones 12 have different URLs (Uniform Resource Locators), and terminal device 20 and mobile telephone 21 can access the appropriate web server by specifying the appropriate URL, respectively. Web server for personal computers 11 and web server for mobile telephones 12 respectively provide web page layouts and data entry input systems optimized for output on personal computer displays and output on mobile telephone LCD units.

In other words, the store opens on-line stores offering the same content on web server for personal computers 11 and web server for mobile telephones 12, and the web pages provided by the respective servers have different interfaces.

Member information management system 10, web server for personal computers 11, and web server for mobile telephones 12 can be constructed on a general computer having a configuration including a CPU, main memory, external storage device such as a hard disk drive, input device such as a keyboard or mouse, display device such as a monitor, and a communication device. Member information management system 10, web server for personal computers 11, and web server for mobile telephones 12 can further be constructed on the same or on plural different computers.

More specifically, the computer can function as member information management system 10, web server for personal computers 11, and web server for mobile telephones 12 by running a specific computer program. This computer program can further be recorded to and distributed on a removable storage medium such as a CD-ROM.

Figure 2:
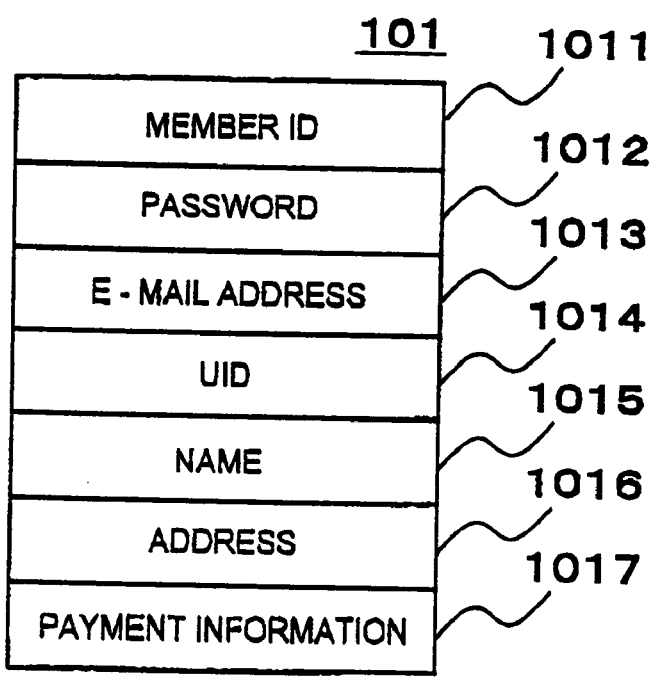
FIG. 2 describes the data structure of a member database.

Member information management system 10 constructs a member database 101 and manages registered member information for the on-line store. The member database 101 can have a data structure such as shown in FIG. 2, for example. In this figure member database 101 has a member ID field 1011, password field 1012, e-mail address field 1013, UID field 1014 for storing a UID, identification information that is specific to a specific mobile telephone, name field 1015, address field 1016, and payment information field 1017 for storing credit card information or other information required to settle payments.

Member information management system 10 also records an access log for each member with the access log containing a purchase history for the member at the on-line store. This information can be linked to the member database 101 by recording the log with a relation to the member ID.

Terminal device 20 can also be constructed on a general computer having a configuration including a CPU, main memory, external storage device such as a hard disk drive, input device such as a keyboard or mouse, display device such as a monitor, a communication device, and a browser function.

Mobile telephone 21 has, in addition to telephone functions, an input device such as operating keys, a display device such as an LCD, an Internet connection function, and a browser function.

In general, device-specific identification information (hereinafter referred to as a "UID") is added to data sent to the Internet 15 from a mobile telephone 21 having an Internet connection function, and a web server receiving this data can identify the mobile telephone that sent the data. The specific format of the UID information will differ according to the data communication specification of the mobile telephone, but is typically recorded to a specific location in a packet sent from the mobile telephone 21 via the Internet 15. Because this format is known, the web server receiving data from the mobile telephone can extract the UID and based thereon identify the mobile telephone. It should be noted that this device-specific UID can be universal information such as a code embedded in a chip, or can be information that can be changed by a communications service provider, for example, and is stored in nonvolatile memory. In either case it enables the mobile telephone to be identified.

Operation of terminal device 20 and mobile telephone 21 in an embodiment of the present invention thus comprised when a user who desires to use the on-line store from either device first registers with the on-line store as a new member, and then accesses to do some shopping, is described next below.

There are two scenarios to consider: when a user uses terminal device 20 first to access web server for personal computers 11 and register as a new member, and then uses terminal device 20 to access web server for personal computers 11 or uses mobile telephone 21 to access web server for mobile telephones 12 (the first case); and when a user uses mobile telephone 21 first to access web server for mobile telephones 12 and register as a new member, and then uses mobile telephone 21 to access web server for mobile telephones 12 or uses terminal device 20 to access web server for personal computers 11 (the second case).

Figure 3:
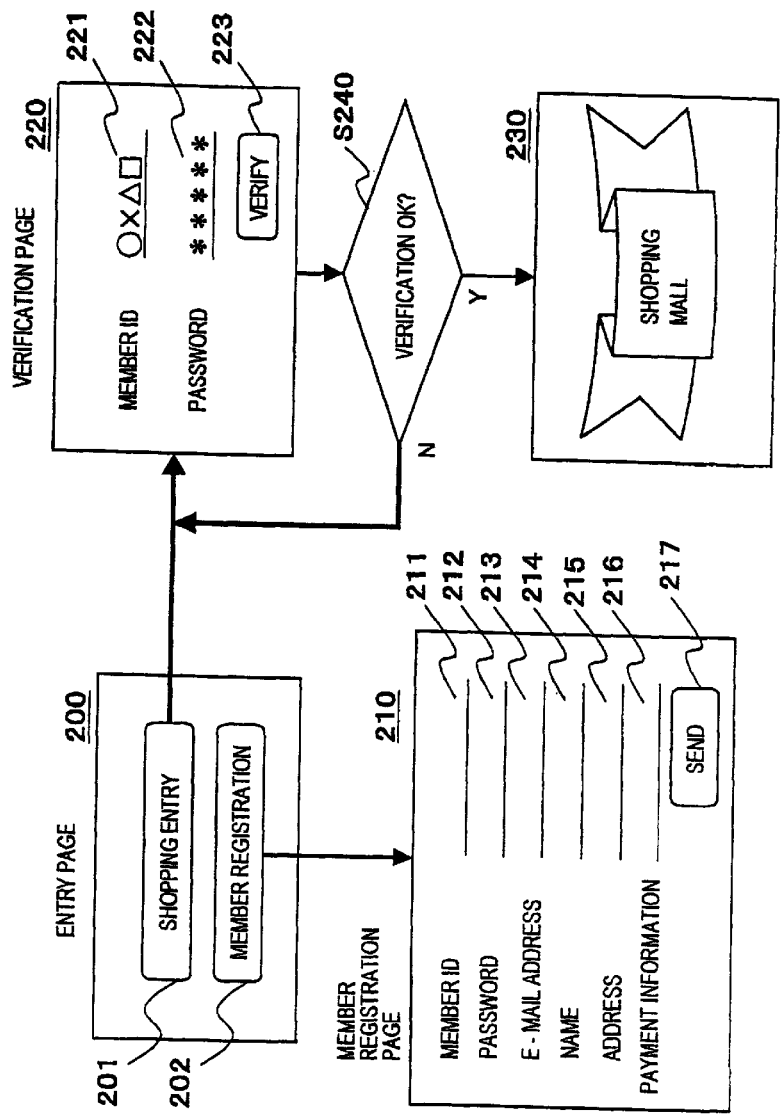
FIG. 3 is a flow chart for describing operation of a web server for a personal computer.
Figure 4:
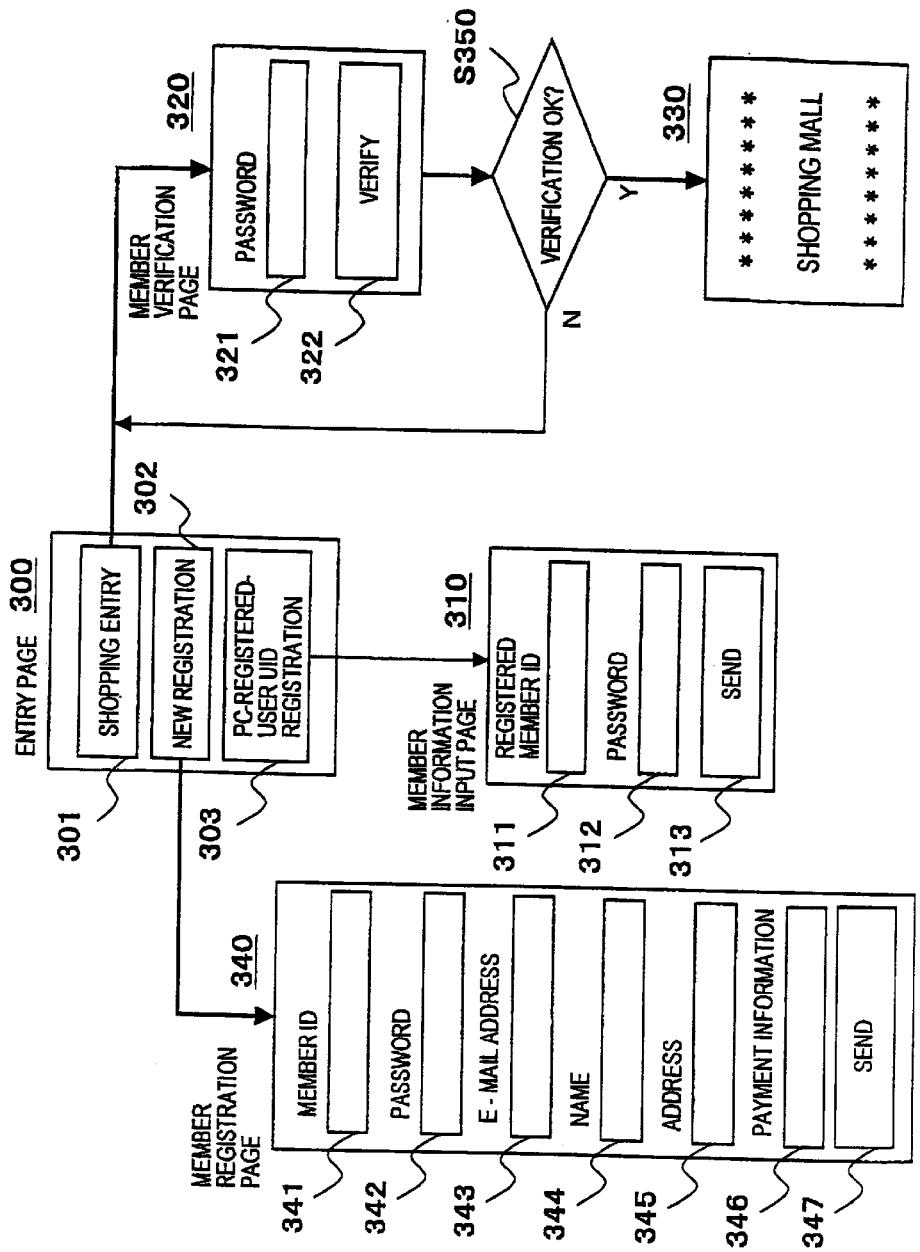
FIG. 4 is a flow chart for describing operation of a web server for a mobile telephone.

The first case is described first below. FIG. 3 and FIG. 4 are flow charts for describing the related operation.

The operation whereby terminal device 20 accesses web server for personal computers 11 and runs the new member registration process is described with reference to FIG. 3.

When terminal device 20 accesses web server for personal computers 11, web server for personal computers 11 presents entry page 200 on terminal device 20. As shown in the figure, entry page 200 has a shopping entry button 201 for moving to the page presenting the on-line store, and a member registration button 202 for new member registration.

It should be noted that the related web pages are presented by web server for personal computers 11 reading a file written in HTML, for example, and recorded to web server for personal computers 11 in response to an instruction from terminal device 20, sending the file to terminal device 20, and the browser function of terminal device 20 interpreting the file content and displaying the file content on the display device of terminal device 20. The web server for personal computers 11 thus has a control means for recording files for generating web pages, and reading these files in response to instructions from terminal device 20. Input by the terminal device 20 to the web page, such as button clicks and text data input, is sent as specific information to the web server for personal computers 11. The web server for personal computers 11 then responds specifically to the received information.

A user who is an unregistered member can click on member registration button 202 on entry page 200 to perform the member registration process.

When web server for personal computers 11 detects a click on member registration button 202, it presents a member registration page 210 to terminal device 20. As shown in the figure, this member registration page 210 has a member ID input column 211, password input column 212, e-mail address input column 213, name input column 214, address input column 215, payment information input column 216 for inputting a credit card number or other information required for settling payment, and send button 217.

Using the keyboard or other input device, the user enters the required information to the member ID input column 211, password input column 212, e-mail address input column 213, name input column 214, address input column 215, and payment information input column 216 of the member registration page 210. When the user then clicks on send button 217, the information entered to the various columns can be sent to web server for personal computers 11. It should be noted that the member ID and password are data that is used to identify the user and verify that the user is a member. The user can determine the member ID and password within the predetermined limits of the usable character range and number of characters.

When the web server for personal computers 11 receives a click on send button 217, it receives the information entered to each of the input columns and records the information as member data to the member database 101. More specifically, the information input to the member ID input column 211 is stored to member ID field 1011, the information input to the password input column 212 is stored to password field 1012, the information input to the e-mail address input column 213 is stored to e-mail address field 1013, the information input to the name input column 214 is stored to the name field 1015, the information input to the address input column 215 is stored to the address field 1016, and the information input to the payment information input column 216 is stored to the payment information field 1017. The new member registration process of the user is completed by means of recording this information to member database 101.

However, duplication of member IDs among the registered members is not allowed because the member ID is used to identify the user. Therefore, the web server for personal computers first refers to the already registered member data to check for duplicates when recording the member information. If the received member ID is thus determined to be a duplicate, input of a different member ID is required. Alternatively, the web server for personal computers 11 generates and assigns member IDs to the user during member registration to prevent duplication of member IDs.

The member ID could also be matched to the e-mail address. This is because the e-mail address in principle identifies an individual and duplication is not allowed. Another advantage is that it is easy for the user to remember. In this case the member registration page 210 notifies and prompts the user to use the e-mail address as the member ID, and the e-mail address input column 213 is then omitted.

On the other hand, because the member ID is linked to personal information, security problems, for example, could arise if the member ID is known to other persons. As a result, an identification code separate from the member ID set during member registration can be assigned to the user and managed separately from the personal information so that this identification code is used when there are inquiries from the user, thus minimizing use of the member ID.

Operation when a user that has completed the new member registration as described above then uses terminal device 20 to access web server for personal computers 11 and go shopping is described next with reference to FIG. 3.

Once the member registration process has been completed, it is not necessary to repeat the member registration process when terminal device 20 is used for access after the next time. Registered users can click the shopping entry button 201 on the entry page 200.

When web server for personal computers 11 receives a click on shopping entry button 201, it presents member verification page 220 on terminal device 20. As shown in the figure, member verification page 220 has a member ID input column 221, password input column 222, and verify button 223.

The user can input the previously registered member ID and password, and click on verify button 223, on the member verification page 220.

When web server for personal computers 11 receives a click on verify button 223, it extracts the member data from member database 101 using the input member ID as the search key. It then detects if the password registered to the extracted member data matches the input password (S240).

If the password matches, the user is verified to be a member, and shopping mall page 230 is presented on terminal device 20.

If the password does not match, or if the input member ID is not recorded in the member database 101, verification fails, the member verification page 220 is again presented on the terminal device 20, and the user is prompted to enter the member ID and password.

A user that has passed the verification process can then proceed with shopping as desired in the shopping mall. A user log including, for example, the purchase history at the shopping mall, is then recorded linked to the member ID by member information management system 10.

Operation when a user that has completed the new member registration using web server for personal computers 11 then uses mobile telephone 21 to access web server for mobile telephones 12 is described next with reference to FIG. 4.

When mobile telephone 21 accesses web server for mobile telephones 12, web server for mobile telephones 12 presents entry page 300 on mobile telephone 21. As shown in the figure, entry page 300 has a selectable shopping entry menu 301 for moving to the page presenting the on-line store, new registration menu 302, and PC-registered-user UID registration menu 303.

It should be noted that this web page is displayed on the display device of the mobile telephone 21 by web server for mobile telephones 12 reading, in response to an instruction from the mobile telephone 21, a file written in C-HTML, for example, and recorded to the web server for mobile telephones 12, sending the file to mobile telephone 21, and the browser function of the mobile telephone 21 interpreting the file content. The web server for mobile telephones 12 thus has a control means for recording a file for generating the web page, and reading the file in response to an instruction from mobile telephone 21. Input by the mobile telephone 21 to the web page, such as menu selection and text data input, is sent as specific information to the web server for mobile telephones 12. The web server for mobile telephones 12 then responds specifically to the received information.

At the entry page 300, users that have already registered as members on web server for personal computers 11 can select PC-registered-user UID registration menu 303 to run the UID registration process.

Having received selection of PC-registered-user menu 303, web server for mobile telephones 12 presents a member information input page 310 on mobile telephone 21. As shown in the figure, member information input page 310 has a member ID input column 311, password input column 312, and send menu 313.

At the member information input page 310, a user can select send menu 313 with handling mobile telephone's keys by inputting the member ID and password, which has registered with the above-mentioned web server for personal computers 11, on the ID input column 311 and password input column 312.

Having received selection of send menu 313, web server for mobile telephones 12 extracts the UID, that is, device-specific identification information for identifying the mobile telephone 21, from the information including the member ID and password.

The web server for mobile telephones 12 then extracts the member data from member database 101 using the member ID sent from mobile telephone 21 as the search key. It then determines whether or not the password registered in the extracted member data matches the inputted password. If the password matches, it registers the extracted UID in the UID field 1014 of the extracted member data, and ends the UID registration process.

If the password does not match, or if the member ID is not registered in the member database 101, the member information input page 310 is again presented on the mobile telephone 21 and the user is prompted to enter the member ID and password again.

It should be noted that if the e-mail address registered on web server for personal computers 11 and the e-mail address usable by the mobile telephone 21 differ, the UID registration process may also be configured to additionally register the e-mail address of the mobile telephone. In this case a mobile telephone e-mail address field is also provided in the member database 101, and a column prompting input of the mobile telephone e-mail address can be displayed on the member information input page 310. In this way the site can send e-mail as necessary to both the terminal device 20 and mobile telephone 21 or to either selected e-mail address.

To confirm whether the registered e-mail address of the mobile telephone 21 is valid (that is, can be used and can identify the user), the following process may be run in the UID registration process before presenting entry page 300 to the mobile telephone 21.

That is, a user attempting to use the on-line store by using mobile telephone 21 first accesses a temporary registration web page provided by the web server for mobile telephones 12. The web server for mobile telephones 12 prompts the user to input the e-mail address to this temporary registration web page. When the user inputs the e-mail address and sends it to the web sever, the communication connection to the web server for mobile telephones 12 may once be terminated.

When the web server for mobile telephones 12 receives the e-mail address information inputted by the user, it temporarily records the information, and then sends an e-mail containing information for viewing the entry page 300, such as the URL, to the recorded e-mail address.

The user receiving this e-mail address can then view the entry page 300 based on the information written in the e-mail message, and can register the UID.

By determining whether the e-mail address inputted during UID registration matches the temporarily stored e-mail address, web server for mobile telephones 12 can determine whether the inputted e-mail address is valid. If the inputted e-mail address is determined to not be valid, registration is refused or the user may be prompted to re-enter the information to the temporary registration web page.

Once the UID registration process is completed, the UID registration process does not need to be repeated at subsequent accesses using mobile telephone 21. Furthermore, because the registration process was completed using terminal device 20 from web server for personal computers 11, it is not necessary even the first time access is made with mobile telephone 21 to carry out a complicated registration process requiring address entry, for example, using the limited keys of a mobile telephone.

Users that have completed the UID registration process can select the shopping entry menu 301 from entry page 300.

Web server for mobile telephones 12 that has received selection of shopping entry menu 301 presents member verification page 320 on mobile telephone 21. As shown in the figure, this member verification page 320 has a password input column 321 and verify menu 322.

At the member verification page 320 the user inputs the already-registered password to password input column 321, and can select verify menu 322. As described below, member ID input is unnecessary on this page.

Web server for mobile telephones 12 that has received selection of verify menu 322 extracts the UID information identifying the mobile telephone 21 from the information, including the password, sent from mobile telephone 21.

The web server for mobile telephones 12 then extracts the member data from member database 101 using the extracted UID as extracted member data matches the input password is then determined (S350).

If the password is determined to match, the user is confirmed to be a member and the shopping mall page 330 is presented on mobile telephone 21.

On the other hand, if the password does not match, or if the member ID is not registered in the member database 101, verification fails, the member verification page 320 is again presented on the mobile telephone 21, and the user is prompted to enter the password.

A user that has passed the verification process can then proceed with shopping as desired in the shopping mall. A user log including, for example, the purchase history at the shopping mall, is then recorded linked to the member ID by member information management system 10. It is thus possible to centrally manage a purchase history or other log for the same person using the member ID as a key whether terminal device 20 is used for access and shopping or mobile telephone 21 is used for access and shopping.

It is also not necessary for the user to manage plural member IDs, and the effort of inputting the member ID when using mobile telephone 21 for access can be eliminated.

The second case, that is, using mobile telephone 21 to carry out the new member registration with web server for mobile telephones 12, and then using terminal device 20 to access web server for personal computers 11 or using mobile telephone 21 to access web server for mobile telephones 12, is described next.

The operation when mobile telephone 21 is used to access web server for mobile telephones 12 and run the new member registration process is described with reference to FIG. 4.

When mobile telephone 21 accesses web server for mobile telephones 12, web server for mobile telephones 12 presents entry page 300 on mobile telephone 21. As shown in the figure, entry page 300 has a selectable shopping entry menu 301 for moving to the page presenting the on-line store, new registration menu 302, and PC-registered-user menu 303.

Users that have not completed member registration can select the new registration menu 302 on the entry page 300 to perform the new member registration process.

When selection of new registration menu 302 is received, web server for mobile telephones 12 presents the member registration page 340 on the mobile telephone 21. As shown in the figure, the member registration page 340 has a member ID input column 341, password input column 342, e-mail address input column 343, name input column 344, address input column 345, payment information input column 346, and send menu 347.

The user can use the operating keys to input the required information to the member ID input column 341, password input column 342, e-mail address input column 343, name input column 344, address input column 345, and payment information input column 346 on the member registration page 340. The information inputted to each column can then be sent to web server for mobile telephones 12 by selecting the send menu 347.

When send menu 347 selection is received, web server for mobile telephones 12 receives the information inputted to each column and registers it as member data to member database 101. That is, the information inputted to member ID input column 341 is stored to member ID field 1011, the information inputted to password input column 342 is stored to password field 1012, the information inputted to e-mail address input column 343 is stored to e-mail address field 1013, the information inputted to name input column 344 is stored to name field 1015, the information inputted to address input column 345 is stored to address field 1016, and the information inputted to payment information input column 346 is stored to payment information field 1017. In addition, web server for mobile telephones 12 extracts the UID information for identifying mobile telephone 21 from the information sent from mobile telephone 21. This UID is then recorded added to UID field 1014 for the member data. The new member registration process for the user is completed by recording the information to member database 101.

As described above, the e-mail address can be used as the member ID, or the web server for mobile telephones 12 can generate the member ID.

Operation when a user that has completed the new member registration as described above then uses mobile telephone 21 to access web server for mobile telephones 12 for shopping is described next with reference to FIG. 4.

Once the member registration process has been completed, it is not necessary to repeat the member registration process when mobile telephone 21 is used for access after the next time. Registered users can select the shopping entry menu 301 on the entry page 300.

When selection of shopping entry button 301 is received, web server for mobile telephones 12 presents the member verification page 320 on mobile telephone 21. As shown in the figure, member verification page 320 has a password input column 321 and verify menu 322.

The user inputs the already registered password in the member verification page 320 and can select verify menu 322. As described below, inputting the member ID is unnecessary on this page.

When selection of verify menu 322 is received, web server for mobile telephones 12 extracts the UID for identifying the mobile telephone 21 from the information, including the password, sent from mobile telephone 21.

The web server for mobile telephones 12 then extracts the member data from member database 101 using the extracted UID as the search key, and determines whether or not the password registered in the extracted member data matches the input password (S350).

If the password is determined to match, the user is verified to be a registered member, and shopping mall page 330 is presented on the mobile telephone 21. It is thus possible to eliminate the effort of inputting the member ID when using mobile telephone 21 for access.

On the other hand, if the password does not match, verification fails, member verification page 320 is presented on mobile telephone 21 and the user is prompted to input the password.

A user that has passed the verification process can then proceed with shopping as desired in the shopping mall. A user log including, for example, the purchase history at the shopping mall, is then recorded linked to the member ID by member information management system 10.

Operation when a user that has completed new member registration as described above on the web server for mobile telephones 12 then uses terminal device 20 to access web server for personal computers 11 is described next with reference to FIG. 3.

When terminal device 20 accesses web server for personal computers 11, web server for personal computers 11 presents entry page 200 on terminal device 20. As shown in the figure, entry page 200 has a shopping entry button 201 for moving to the page presenting the on-line store, and a member registration button 202 for new member registration.

Users that have completed the member registration on the web server for mobile telephones 12 can click on the shopping entry button 201 on entry page 200.

When web server for personal computers 11 receives a click on shopping entry button 201, it presents member verification page 220 on terminal device 20. As shown in the figure, member verification page 220 has a member ID input column 221, password input column 222, and verify button 223.

The user can input the previously registered member ID and password and click on verify button 223 on the member verification page 220.

When web server for personal computers 11 receives a click on verify button 223, it extracts the member data from member database 101 using the inputted member ID as the search key. It then determines if the password registered to the extracted member data matches the inputted password (S240).

If the password matches, the user is verified to be a member, and shopping mall page 230 is presented on terminal device 20.

On the other hand, if the password does not match, or if the input member ID is not recorded in the member database

101, verification fails, the member verification page 220 is again presented on the terminal device 20, and the user is prompted to enter the member ID and password.

A user that has passed the verification process can then proceed with shopping as desired in the shopping mall. A user log including, for example, the purchase history at the shopping mall, is then recorded linked to the member ID by member information management system 10. It is thus possible to centrally manage a purchase history or other log for the same person using the member ID as a key whether terminal device 20 is used for access and shopping or mobile telephone 21 is used for access and shopping. It is also not necessary for the user to manage plural member IDs.

As described above, a UID, that is, device-specific identification information, is recorded to the member database in this example. As a result, if the mobile telephone changes, for example, it is necessary to change the UID information registered in the member database. In this case the UID information registered in the member database can be updated by using a new mobile telephone 21 to access the web server for mobile telephones 12, again selecting the PC-registered-user UID registration menu, and registering the UID of the new mobile telephone 21. A page for changing the UID registration could, of course, be provided on the web server for mobile telephones 12 and the user is prompted to access this page. However, if the UID information is based on the telephone number of the mobile telephone, that is, if the device-specific identification information can be rewritten according to the telephone number registered in the mobile telephone, the device-specific identification information can be maintained even if the mobile telephone is changed by registering the same phone number as before in the mobile telephone, and in this case it is not necessary to change the UID information registered in the member database. Because old mobile telephones are made unusable by the communication service provider or the UID information is deleted, new mobile telephones can be identified from the same UID information.

Changes in e-mail address, address, or other information can also be likewise accepted using the member registration page, or a separate page for changing registration content can be provided. In this case the UID information can be maintained.

It will be obvious that the present invention shall not be limited to the embodiment described above, and can be modified in various ways without departing from the intended scope of the invention.

For example, a UID that is device-specific identification information is contained in the information from the mobile telephone 21 in the above embodiment, but if device-specific identification information is contained in the information from the terminal device 20, this information may also be registered in the member database 101. In this case plural UID information fields are provided in the member database 101 or registering plural UIDs is allowed so that the member can be identified by extracting the device-specific identification information whether access is by mobile telephone 21 or by a terminal device 20 capable of sending device-specific identification information. That is, once a relationship is established between the UID for each device and the member ID, the member ID input step can be omitted from the verification process for subsequent accesses.

It will also be obvious that terminal device 20 and mobile telephone 21 in the above embodiment are shown by way of example only, and the present invention can be used with entertainment devices, portable terminal devices, and other types of information processing devices having a communication function.

Once central management of member information is made possible by the present invention, central management of not only a user log containing a purchase history, but other types of information is also possible. For example, if the on-line store has a point system, accumulated points data can also be centrally managed. Moreover, because central management of purchase product selection information when purchases are made is also possible, selection of a product to purchase could be made using the mobile telephone while going out, and the purchasing procedure can be completed after returning home and confirming the products using the PC.

Furthermore, because it is also not necessary for the store to separate customers that purchase product by accessing the shopping mall with a PC and customers that purchase product by accessing with a mobile telephone, inventory management of inventory data, product master data, and sale price data, for example, can be centrally managed.

It is therefore possible according to the present invention to centrally manage member information in a membership system website that is accessible from a plurality of mediums.

It is also possible by means of the present invention to reduce the effort of text input to a website.

What is claimed is:

1. A member information registration method for registering member information in a member database, comprising the steps of:

receiving an individual identifier and a verification code outputted from a first device, and registering the received individual identifier and verification code as member data in the member database; and receiving an individual identifier, verification code, and identification information specific to a second device outputted from the second device, extracting from the member database member data matching both the received individual identifier and the verification code, and adding the identification information specific to the second device to the matched member data in the member database.

2. A member information registration system for registering member information in a member database, comprising:

a data registration means for receiving an individual identifier and verification code outputted from a first device, and registering the received individual identifier and verification code as member data in the member database; and a data updating means for receiving an individual identifier, verification code, and identification information specific to the second device outputted from a second device, extracting from the member database member data matching both the received individual identifier and the verification code, and adding identification information specific to the second device to the matched member data in the member database.

3. A member information registration system as described in claim 2, wherein the first device and the second device are connected by way of a computer network.

4. A member information registration system as described in claim 2, wherein the second device is a mobile telephone.

5. A member information registration system as described in claim 2, wherein an e-mail address is used for the individual identifier.

6. A member information registration system as described in claim 2, further comprising a means for generating and outputting to the first device a specific individual identifier before the individual identifier outputted from the first device is received.

7. A member information registration system as described in claim 2, further comprising a means for issuing and outputting to the first device another individual identifier distinct from the received individual identifier, and registering said distinct individual identifier separately from member data in the member database.

8. A member information registration system for registering member information in a member database, comprising:
a data registration means for receiving from a communication device an individual identifier, verification code, and identification information specific to the communication device, and registering the received individual identifier, verification code, and identification information specific to the communication device as member data in the member database.

9. A member information registration system, comprising:
a member database for storing member data including an individual identifier, verification code, and identification information specific to a communication device; and
a data updating means for extracting member data matching both a received individual identifier and verification code from the member database when the individual identifier, the verification code, and identification information specific to the communication device are received from a communication device, and adding the device-specific identification information specific to the communication device to the matched member data in the member database.

10. A member verification method for a registered membership system service on a computer network, comprising steps of:
storing in a member database member data in which a member-specific recognition code and identification information specific to a communication device used by the member are linked;
determining if member data matching both the received recognition code and communication-device-specific identification information are present in the member database when the recognition code and communication-device-specific identification information are received from a communication device; and
verifying a registered member when said member data is present.

11. A member verification system for verifying members in a registered membership system service on a computer network, comprising:
a member database for storing member data in which a member-specific recognition code and identification information specific to a communication device used by the member are linked; and
a verification means for determining if member data matching both a recognition code and communication-device-specific identification information received from a communication device are present in the member database, and
verifying a registered member when said member data is present.

12. A server computer having an on-line shopping providing means for receiving product transaction orders from registered member customers via a computer network, comprising:
a member database for recording customer data including a customer identification ID, verification code, identification information specific to a communication device used by the customer, and a product transaction history for the customer;
the member database receiving an identification ID and verification code from a customer, identifying customer data from the received identification ID and verification code when a product transaction order is received, and recording information related to product transaction orders to the product transaction history of the identified customer data, and
receiving a verification code and communication device-specific identification information from a customer, identifying customer data from the received verification code and communication device-specific identification information when a product transaction order is received, and recording information relating to the product transaction order to the product transaction history of the identified customer data.

13. A computer readable recording medium on which a program is recorded, the program for causing a computer to function as a member information registration system for registering member information in a member database, which causes the computer to function as the following means:
a data registration means for receiving an individual identifier and a verification code outputted from a first device, and registering the received individual identifier and verification code as member data in the member database; and
a data updating means for receiving an individual identifier, verification code, and identification information specific to a second device outputted from the second device, extracting from the member database member data matching both the received individual identifier and the verification code, and adding identification information specific to the second device to the matched member data in the member database.

14. A computer readable recording medium on which a program is recorded, the program for causing a computer to function as a member information registration system for registering member information in a member database, which causes the computer to function as the following means:
a member database means for storing member data including an individual identifier a verification code, and identification information specific to a communication device; and
a data updating means for extracting member data matching both an individual identifier and a verification code from the member database when the individual identifier, the verification code, and identification information specific to the communication device are received from a communication device, and adding the device-specific identification information to the matched member data in the member database.

15. A computer readable recording medium on which a program is recorded, the program for causing a computer to function as a member verification system for verifying members in a registered membership system service on a computer network, which causes the computer to function as the following means:
a member database for storing member data in which a member-specific recognition code and identification information specific to a communication device used by the member are linked; and
a verification means for determining if member data matching both the received verification code and communication-device-specific identification information are present in the member database when a recognition code and communication-device-specific identification information are received from a communication device, and verifying a registered member when said member data is present.

16. A computer readable recording medium on which a program is recorded, the program for causing a computer to function as a server computer, which causes the computer to function as the following means:

an on-line shopping providing means for receiving product transaction orders from registered member customers via a computer network; and a member database means for recording customer data including a customer identification ID, verification code, identification information specific to a communication device used by the customer, and a product transaction history for the customer, receiving an identification ID and verification code from a customer, identifying customer data from the received identification ID and verification code when a product transaction order is received, and recording information related to product transaction orders to the product transaction history of the identified customer data, and receiving a verification code and communication device-specific identification information from a customer, identifying customer data from the received verification code and communication device-specific identification information when a product transaction order is received, and recording information relating to the product transaction order to the product transaction history of the identified customer data.

17. The member information registration system as defined in claim 2, wherein the second device is an entertainment device.

18. The member information registration system as defined in claim 2, wherein the second device is a portable terminal device.

* * * * *